No. 891,088. PATENTED JUNE 16, 1908.
S. LONGANECKER.
WRENCH.
APPLICATION FILED DEC. 31, 1904.
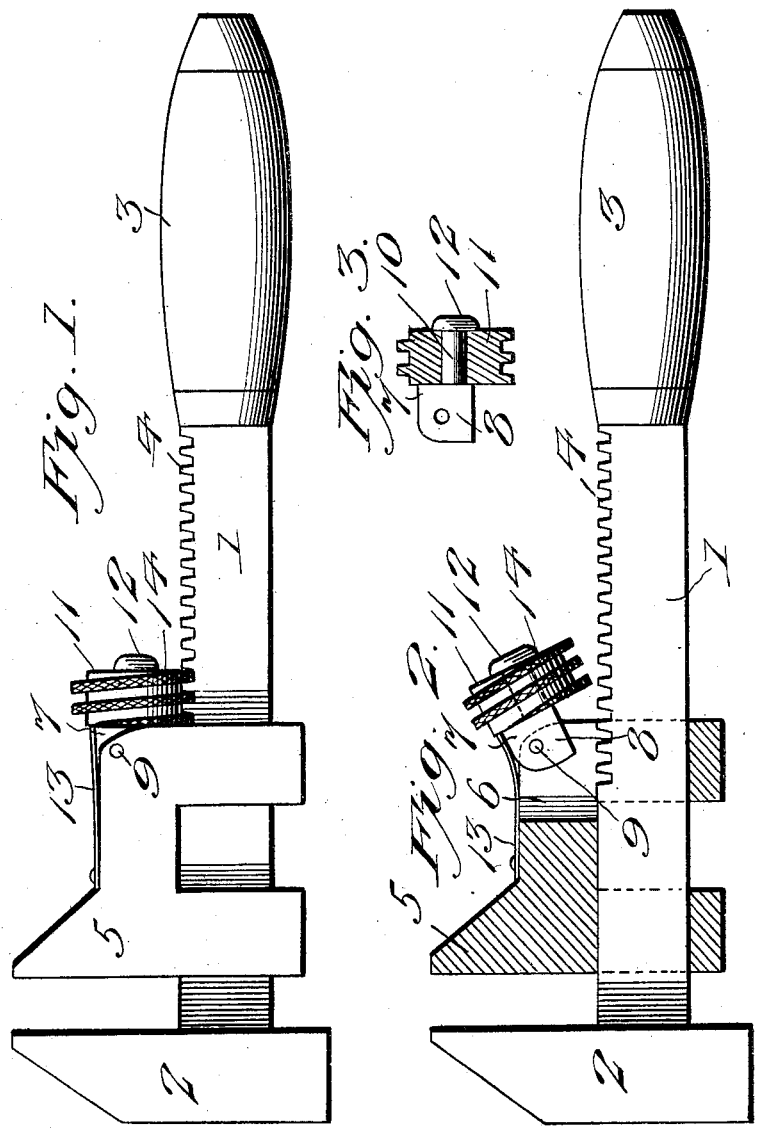
Witnesses
Wm. J. Koerth.
C. C. Hines.
Inventor
Samuel Longanecker,
By Victor J. Evans
Attorney

UNITED STATES PATENT OFFICE.

SAMUEL LONGANECKER, OF ANDERSON, INDIANA.

WRENCH.

No. 891,088.   Specification of Letters Patent.   Patented June 16, 1908.

Application filed December 31, 1904. Serial No. 239,103.

*To all whom it may concern:*

Be it known that I, SAMUEL LONGANECKER, a citizen of the United States, residing at Anderson, in the county of Madison and State of Indiana, have invented new and useful Improvements in Wrenches, of which the following is a specification.

This invention relates to wrenches, and particularly to a wrench of the quick-acting type wherein the movable jaw is adapted for free sliding movement in either direction to attain a proximate adjustment, and may then be set to exact adjustment by the use of a nut acting on teeth on the shank of the wrench.

The invention has for its object the provision of a wrench of this type provided with an adjusting nut constructed and mounted in a novel manner to faciliate its adjustment and enable it to be more easily thrown into and out of action; and to this end the invention consists of the features of construction, combination and arrangement of parts hereinafter fully described and claimed, reference being had to the accompanying drawing, in which:—

Figure 1 is a side elevation of a wrench embodying my invention, showing the nut in its normal position with its thread engaging the teeth in the shank; Fig 2 is a view similar to Fig. 1, showing the sliding jaw in section and the nut thrown out of engagement with the teeth of the shank to enable the jaw to be quickly adjusted; and Fig. 3 is a detail sectional view through the nut, showing the latter mounted upon its bracket.

Referring now more particularly to the drawings, the numeral 1 represents the shank or stock of the wrench provided with the usual fixed jaw 2 and handle 3. This shank or stock is preferably of rectangular shape in cross section and provided along one of its edges with teeth 4.

On the shank 1 is slidably mounted a movable jaw 5 which is bifurcated at its rear above the toothed side of the shank 1 to form a slot 6 to receive the attaching portion of a bracket 7, the said attaching portion consisting of a lug or ear 8 pivotally mounted between the side walls of the bifurcation upon a pivot pin 9 extending transversely between and through said walls. The bracket is provided with a stem 10 projecting rearwardly from the ear or lug and forming a journal for the adjusting nut 11. At its outer end the stem 10 is formed or provided with a stop or shoulder 12 which may be of any preferred construction, but is preferably formed by upsetting or riveting the end of the stem, as shown. The upper edge or surface of the ear 8 is preferably straight or plain surfaced to form an abutment for the free end of a plate or ribbon spring 13 which is fixed at its opposite end to the upper or outer face of the jaw 5 and serves to hold the nut normally in the operative position shown in Fig. 1, in which its screw thread 14 engages the teeth 4 of the shank 1. The thread 14 is milled or roughened to adapt it to serve the additional function of a finger grip by means of which the nut may be swung in and out on its pivot 9 to throw the said thread into and out of engagement with the teeth 4.

When the parts are in their normal position as shown in Fig. 1, the threads of the adjusting element 11 mesh with the teeth 4 of the shank, and as the spring 13 is substantially straight, it exerts little or practically no pressure in the member 7, so that whatever frictional engagement there may be between the thread 14 and teeth 4, will not materially interfere with the free turning of the adjusting element, as for instance when it is desired to obtain a fine adjustment of the slidable jaw. The free end of the spring does not positively engage the flat face of the element 11 when the spring is straight and consequently will not interfere with the free turning of the element. It will be observed that the pivot 9 is located at the opposite side of the axis of the element 11 from the shank of the wrench and when a pressure is exerted on the movable jaw in a direction away from the fixed jaw, as in the operation of the wrench, it will tend to force the adjusting element 11 inwardly toward the shank, so that the threads will be positively engaged with the teeth and slipping thus effectively prevented. It will, therefore, be seen that the spring is not entirely, if at all, relied upon to hold the threads of the element 11 in mesh with the teeth of the shank when the wrench is used for tightening, loosening or turning a nut. In other words, when the spring is straight, it will prevent the adjusting element from accidentally moving outwardly and disengaging from the teeth of the shank and keep the parts in operative position when the wrench is not used for turning a nut, and the spring possesses the additional functions of limiting the outward movement of the element when it is desired to move the sliding jaw for coarse adjustment and of returning the element to normal position after such adjustment is reached.

An important feature of applicant's construction is the arrangement of the adjusting element whereby the flat top face thereof will firmly bear against the bottom surface of the slidable jaw when pressure is exerted on the latter, as in the process of turning a nut. The object of arranging the element to bear on the sliding jaw in this manner is to relieve the pivot 9 of any strain which might tend to shear the said pivot, as would be the case if the said element is so positioned as to be incapable of bearing against the slidable jaw. The spring 13 is arranged on the outside of the slidable jaw and forms a cover for the recess 6 at one side, and the element 11 closes the bottom side of the said recess and thus coöperates with the spring to prevent the entrance of grit and dirt to the recess. By locating the spring at the outside of the member, it can be readily replaced in case it should become broken and the element 11 projects beyond the free end of the spring so that the latter cannot be caught on objects.

In the operation of adjusting the sliding jaw 5 to move it into a desired position with relation to the jaw 2 to grip an object the threaded portion 4 of the nut is engaged between the thumb and forefinger of one hand and the nut thrown against the resistance of its spring out of engagement with the teeth 4, whereupon the jaw 5 may be freely slid backward or forward on the shank 4 to attain the proximate adjustment, after which the nut is released, whereupon the spring 13 swings the bracket 7 back to its normal position so that its thread will engage the teeth 4, and permit the jaw 5 to be adjusted by a screw action back or forth to attain the desired adjustment. It will be observed that the thread 14 is made sufficiently thick or coarse to obtain a quick screw adjustment and at the same time to prevent it from being injured to such an extent by slight shocks or blows as to prevent it from working in the teeth 4. This construction of the thread further permits it to be milled or serrated so that it will afford a secure grip by which the operator may swing the nut on its pivot into and out of engagement with the teeth 4 and to rotate the nut on its stem or journal 10. The form of the screw thread is also advantageous in securing a firm locking action between the nut and shank, so that the spring 13 may be made comparatively light and will yet exert sufficient pressure to prevent the nut from jumping out of engagement with the teeth 4 and releasing the sliding jaw when the wrench is used as a hammer.

In the construction described and shown it will be noted that the free terminal of the spring 13 bears at all times against the forward face of the nut 11, and that said spring is connected to the jaw a distance in advance of the pivotal support of the nut. This construction provides a material advantage in the wrench of this invention, as by the contact of the free end of the spring with the face of the nut, the slightest outward movement of the nut tends to put the spring under tension. As the spring is supported in advance of the pivotal support of the nut, and as the relatively forward or free end of the spring will, under the movement of the nut, tend to move in the arc of the circle, it is obvious that the respective planes of movement of the free end of the spring and of the contacting face of the nut will, coincide at a determinate point beyond which the nut cannot move. Therefore, the particular mounting of the spring and nut insure first that in the outward movement of the nut the spring will be tensioned, and secondly that the spring in such outward movement will, at a determinate point limit the further movement of the nut. Provision is thus made for moving the nut a sufficient distance to disengage it from the teeth on the shank, its further movement being prevented. The advantage of such arrangement is obvious particularly when similar devices have been heretofore constructed with additional means for limiting the disengaging movement of the nut.

Having thus described the invention, what is claimed as new, is:—

A wrench comprising a shank provided with teeth, a fixed jaw thereon, a movable jaw slidable on the shank and provided with a recess open at two sides, a member pivoted in the recess and extending out of the same, a rotatable adjusting element on the member disposed wholly outside the recess and provided with threads adapted to mesh with the teeth, the element being so arranged on the member as to normally close one side of the recess and to bear positively against the slidable jaw, and a spring secured to the movable jaw to serve as a stop for limiting the disengaging movement of the element and for maintaining the element in normal position, said spring being located wholly outside the recess and forming a closure for the other open side of the latter and coöperating with the element to exclude dirt from the recess, the free extremity of the spring being disposed at all times at a point inwardly from the periphery of the element to be protected by the latter.

In testimony whereof, I affix my signature in presence of two witnesses.

SAMUEL LONGANECKER.

Witnesses:
   THEODORE L. ZION,
   E. E. LANGSTON.